US009922213B2

(12) United States Patent
Ishikawa et al.

(10) Patent No.: US 9,922,213 B2
(45) Date of Patent: Mar. 20, 2018

(54) CARD READER

(71) Applicant: NIDEC SANKYO CORPORATION, Suwa-gun, Nagano (JP)

(72) Inventors: Kazutoshi Ishikawa, Nagano (JP); Kazunori Takahashi, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 15/129,996

(22) PCT Filed: Mar. 5, 2015

(86) PCT No.: PCT/JP2015/056480
§ 371 (c)(1),
(2) Date: Sep. 28, 2016

(87) PCT Pub. No.: WO2015/151711
PCT Pub. Date: Oct. 8, 2015

(65) Prior Publication Data
US 2017/0140178 A1 May 18, 2017

(30) Foreign Application Priority Data
Mar. 31, 2014 (JP) .................................. 2014-072114

(51) Int. Cl.
G06K 7/00 (2006.01)
G06K 7/08 (2006.01)

(52) U.S. Cl.
CPC .......... *G06K 7/0026* (2013.01); *G06K 7/087* (2013.01)

(58) Field of Classification Search
CPC .............................. G06K 7/0026; G06K 7/087
See application file for complete search history.

(56) References Cited

U.S. PATENT DOCUMENTS 5,847,371 A * 12/1998 Ieda ..................... G06K 7/0069
235/441
8,496,182 B2 * 7/2013 Mizawa ............. G06K 13/0875
235/382

(Continued)

FOREIGN PATENT DOCUMENTS

JP        S6123282 A    1/1986
JP        S63146189     6/1988

(Continued)

OTHER PUBLICATIONS

International Search Report corresponding to Application No. PCT/JP2015/056480; dated May 12, 2015, with English translation.

*Primary Examiner* — Thien M Le
*Assistant Examiner* — Asifa Habib
(74) *Attorney, Agent, or Firm* — Cantor Colburn LLP

(57) ABSTRACT

A card reader may include an IC contact block; an insertion port; an insertion posture detection mechanism; a tip end detection mechanism; a pulling-out prevention mechanism structured to prevent pulling-out of a card inserted in an inside of the card reader when it is detected that the card is inserted into the insertion port in a correct posture based on a detected result of the insertion posture detection mechanism and, when it is detected that the tip end face of the card in the inserting direction has been inserted to the predetermined position based on a detected result of the tip end detection mechanism; and a pushing-out mechanism structured to push out the card inserted into the inside of the card reader in an ejecting direction of the card which is an opposite direction of the inserting direction.

16 Claims, 6 Drawing Sheets

(56) References Cited

U.S. PATENT DOCUMENTS

| | | | |
|---|---|---|---|
| 2004/0026507 A1* | 2/2004 | Nagata | G06K 7/084 235/449 |
| 2004/0035929 A1* | 2/2004 | Okada | G06K 13/067 235/438 |
| 2006/0138241 A1* | 6/2006 | Kitazawa | G06K 13/067 235/475 |

FOREIGN PATENT DOCUMENTS

| | | |
|---|---|---|
| JP | 2004240611 A | 8/2004 |
| JP | 2013164675 A | 8/2013 |

* cited by examiner

Fig. 4(A)
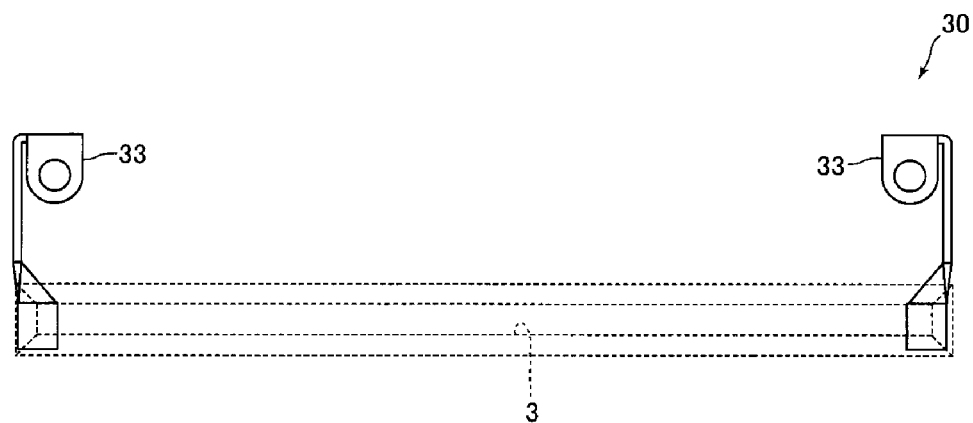
Fig. 4(B)
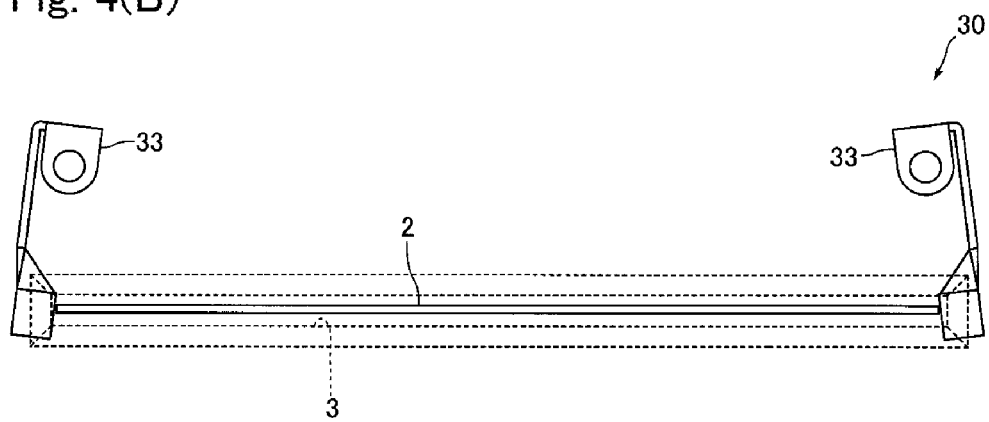
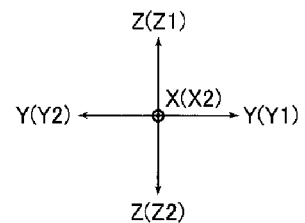

Fig. 5(A)
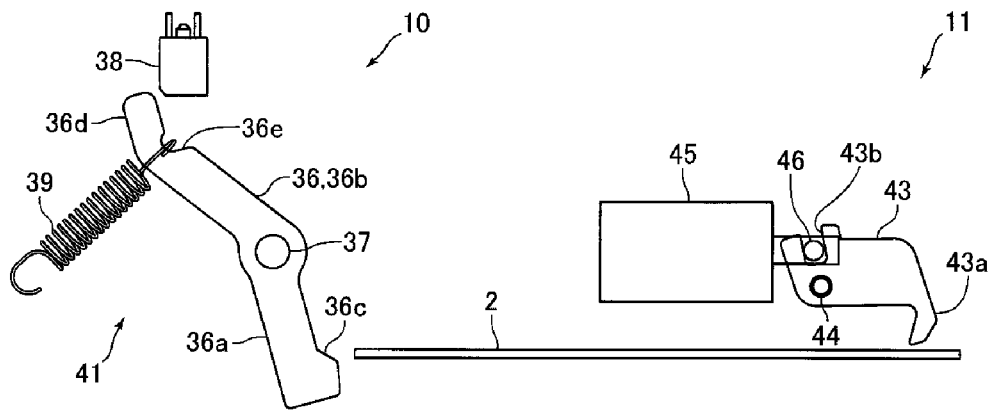
Fig. 5(B)
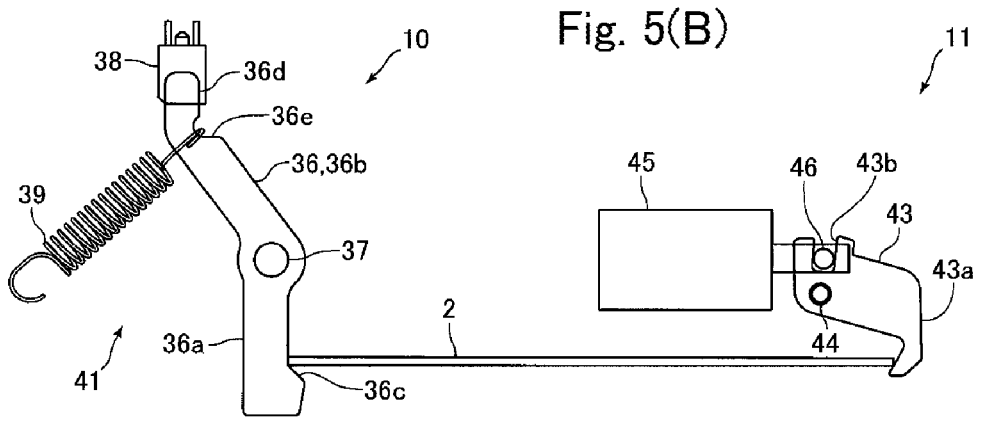
Fig. 5(C)
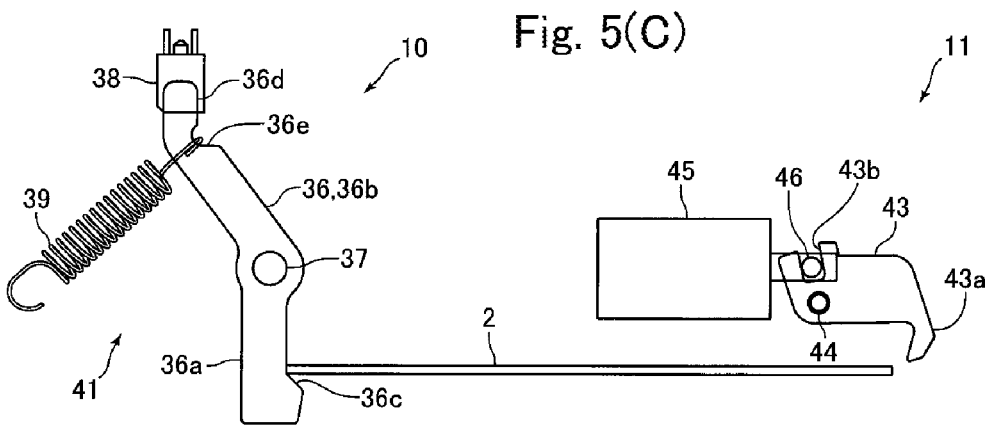
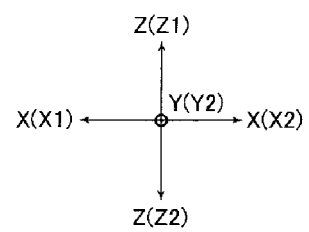

CARD READER

CROSS REFERENCE TO RELATED APPLICATIONS

This is the U.S. national stage of application No. PCT/JP2015/056480, filed on Mar. 5, 2015. Priority under 35 U.S.C. § 119(a) and 35 U.S.C. § 365(b) is claimed from Japanese Application No. 2014-072114, filed Mar. 31, 2014, the disclosure of which is incorporated herein by reference.

TECHNICAL FIELD

At least an embodiment of the present invention relates to a manual type card reader into which a card formed in a substantially rectangular shape is inserted in its short-side direction.

BACKGROUND

Conventionally, a card reader has been known in which a card formed in a substantially rectangular shape is conveyed in its short-side direction and is processed (see, for example, Patent Literature 1). As shown in FIG. 6, a card 2 which is processed in the card reader described in Patent Literature 1 is formed with a magnetic stripe 2a on its rear face. Further, an IC chip is incorporated in the card 2 and an external connection terminal 2b is formed on a front face of the card 2. A magnetic stripe 2a is formed in a long and thin strip shape which is parallel to a longitudinal direction of the card 2. Further, the magnetic stripe 2a is formed at a predetermined position with one end face 2c in a short-side direction of the card 2 as a reference. The external connection terminal 2b is formed at a predetermined position with one end face 2c in a short-side direction of a card 2 and one end face 2d in a longitudinal direction of the card 2 as references. Further, the external connection terminal 2b is formed at a substantially center position of a card 2 in the short-side direction of the card 2.

The card reader described in Patent Literature 1 includes a card conveying mechanism structured to convey a card 2, a magnetic head configured to perform reading of magnetic data recorded in a magnetic stripe 2a and/or recording of magnetic data to the magnetic stripe 2a, a head moving mechanism structure to move the magnetic head in a direction perpendicular to a conveying direction of the card 2, an IC contact block having IC contact springs for contacting with an external connection terminal 2b, and a positioning mechanism for positioning the card 2 taken into an inside of the card reader. The card conveying mechanism includes a conveying roller and a pad roller oppositely disposed to the conveying roller. A motor is connected with the conveying roller through a power transmission mechanism.

PATENT LITERATURE

[PTL 1] Japanese Patent Laid-Open No. 2013-164675

If the card conveying mechanism is detached from the card reader described in Patent Literature 1 for structuring a manual type card reader, the structure of the card reader is simplified and the card reader can be made small and a cost of the card reader can be reduced. Also in the manual type card reader, data communication can be performed between an IC chip of a card 2 and the card reader by contacting an external connection terminal 2b of the card 2 with IC contact springs disposed in an inside of the card reader. The external connection terminal 2b is formed at a substantially center position of a card 2 in a short-side direction of the card 2 and thus, in the manual type card reader, in order to contact the IC contact springs disposed in an inside of the card reader with the external connection terminal 2b, the card 2 is required to be manually inserted to a rear side of the card reader.

However, in a card reader in which a card 2 formed in a substantially rectangular shape is inserted in its short-side direction, when a card 2 is inserted to a rear side of the card reader, a holding margin of a card 2 is reduced and thus a user who has inserted the card 2 into the card reader is hard to pull out the card 2 from the card reader after processing is finished.

SUMMARY

Therefore, in view of the problem described above, at least an embodiment of the present invention provides a manual type card reader in which a card formed in a substantially rectangular shape is inserted in its short-side direction and an inserted card is capable of being easily pulled out even when data communication can be performed between an IC chip of the card and the card reader.

To achieve the above, at least an embodiment of the present invention provides a manual type card reader to which a card incorporated with an IC chip and formed in a substantially rectangular shape is inserted in its short-side direction. The card reader includes an IC contact block having an IC contact spring configured to contact with an external connection terminal of the IC chip formed on the card, an insertion port into which the card is inserted, an insertion posture detection mechanism structured to detect that the card is inserted into the insertion port in a correct posture, a tip end detection mechanism structured to detect that a tip end face of the card in an inserting direction of the card has been inserted to a predetermined position, a pulling-out prevention mechanism structured to prevent pulling-out of the card inserted in an inside of the card reader when it is detected that the card is inserted into the insertion port in a correct posture based on a detected result of the insertion posture detection mechanism and, when it is detected that the tip end face of the card in the inserting direction has been inserted to the predetermined position based on a detected result of the tip end detection mechanism, and a pushing-out mechanism structured to push out the card inserted into the inside of the card reader in an ejecting direction of the card which is an opposite direction of the inserting direction.

The card reader in accordance with at least an embodiment of the present invention includes a pushing-out mechanism structured to push out a card inserted into an inside of the card reader in an ejecting direction of the card which is an opposite direction to an inserting direction. Therefore, according to at least an embodiment of the present invention, even when a card has been inserted to a rear side of the card reader for contacting an external connection terminal formed at a substantially center position of the card in a short-side direction of the card with the IC contact springs disposed in an inside of the card reader, after data communication has been finished between an IC chip of the card and the card reader, the card is pushed in an ejecting direction by the pushing-out mechanism and thereby a user is capable of easily pulling out the card having been inserted into the card reader. In other words, in at least an embodiment of the present invention, in a manual type card reader in which a card formed in a substantially rectangular shape is inserted in its short-side direction, even when data communication can be performed between an IC chip of the card and the card reader, the card inserted into the card reader can be easily pulled out.

Further, the card reader in accordance with at least an embodiment of the present invention includes a pulling-out prevention mechanism structured to prevent pulling-out of a card having been inserted into an inside of the card reader. Therefore, pulling-out of a card can be prevented when data communication is performed between an IC chip of the card and the card reader. Accordingly, in at least an embodiment of the present invention, appropriate data communication can be performed between an IC chip of a card and the card reader.

In addition, in the card reader in accordance with at least an embodiment of the present invention, the pulling-out prevention mechanism prevents pulling-out of a card having been inserted into an inside of the card reader when it is detected that the card is inserted into the insertion port in a correct posture based on a detected result of the insertion posture detection mechanism and, in addition, when it is detected that a tip end face of the card in an inserting direction has been inserted to a predetermined position based on a detected result of the tip end detection mechanism. In other words, in at least an embodiment of the present invention, the pulling-out prevention mechanism does not prevent pulling-out of a card in a case that a card is inserted into the insertion port in a wrong posture or, in a case that a tip end face of the card in an inserting direction is not inserted to a predetermined position. Therefore, according to at least an embodiment of the present invention, in a case that a card is inserted into the insertion port in a wrong posture or, in a case that a tip end face of the card in an inserting direction is not inserted to a predetermined position, the card can be pushed out in an ejecting direction by the pushing-out mechanism. Further, when the card is pushed out in an ejecting direction by the pushing-out mechanism, a situation that the card has been inserted into the insertion port in a wrong posture, or a situation that a tip end face of the card in an inserting direction is not inserted to a predetermined position can be notified to a user who has inserted the card.

In at least an embodiment of the present invention, it is preferable that the card reader comprises at least two tip end detection mechanisms which are separately disposed with a predetermined space therebetween in a width direction of the card perpendicular to a thickness direction and the inserting direction of the card inserted into the insertion port. According to this structure, it can be detected whether a short-side direction of a card is inclined with respect to an inserting direction of the card or not by at least the two tip end detection mechanisms which are separately disposed with a predetermined space therebetween in the width direction of the card. Further, when a short-side direction of a card is inclined with respect to an inserting direction of the card and, in a case that one tip end detection mechanism detects that a tip end face of the card in the inserting direction has been inserted to a predetermined position but that another tip end detection mechanism does not detect that the tip end face of the card in the inserting direction has been inserted to the predetermined position, pulling-out prevention for the card by the pulling-out prevention mechanism is not performed and the card can be pushed out in an ejecting direction by the pushing-out mechanism. Therefore, a user can be notified that the card is required to be inserted again so that a short-side direction of the card does not incline with respect to the inserting direction. Further, when a card is inserted again so that a short-side direction of the card does not incline with respect to the inserting direction, an external connection terminal of the card and the IC contact springs can be surely contacted with each other and appropriate data communication can be performed between an IC chip of the card and the card reader.

In at least an embodiment of the present invention, it is preferable that the tip end detection mechanism includes an abutting member provided with an abutting part which is moved to an inserting direction side when a tip end face of the card in the inserting direction is abutted, a sensor configured to detect movement of the abutting member, and an urging member which urges the abutting member so that the abutting part pushes the card in the ejecting direction, and at least a part of the pushing-out mechanism is structured of the abutting member and the urging member. In this case, a part of the tip end detection mechanism and at least a part of the pushing-out mechanism can be structured by using common members. Therefore, a structure of the card reader can be simplified.

In at least an embodiment of the present invention, for example, the insertion posture detection mechanism includes a width detection mechanism structured to detect whether the card is inserted into the insertion port in its short-side direction, or the card is inserted into the insertion port in its longitudinal direction, and a front/rear face detection mechanism structured to detect whether a front face of the card inserted into the insertion port faces upward or its rear face faces upward. In this case, it can be detected whether a card is inserted into the insertion port so that a short-side direction of the card is coincided with an inserting direction of the card, or the card is inserted into the insertion port so that a longitudinal direction of the card is coincided with the inserting direction of the card, and it can be detected whether a posture of a front/rear face of the card inserted into the insertion port is correct or not.

In at least an embodiment of the present invention, the card is formed with a magnetic stripe and the front/rear face detection mechanism includes, for example, at least one of a magnetic head or a magnetic sensor configured to detect the magnetic stripe and a metal detection mechanism structured to detect the external connection terminal.

In at least an embodiment of the present invention, it is preferable that the pulling-out prevention mechanism includes a pulling-out prevention member configured to contact with an end face on an ejecting direction side of the card and prevent pulling-out of the card. According to this structure, pulling-out of a card can be surely prevented by the pulling-out prevention mechanism.

In at least an embodiment of the present invention, it is preferable that the card insertion part formed with the insertion port is formed with a recessed part which is recessed from an end face on an ejecting direction side of the card insertion part toward an inserting direction side. According to this structure, even when a card has been inserted to a rear side of the card reader so that a short-side direction of the card and its inserting direction are coincided with each other, a user is capable of easily pushing the card to a rear side of the card reader by utilizing the recessed part. Further, according to this structure, the tip end detection mechanism and/or the pulling-out prevention mechanism can be disposed by utilizing a portion of the card insertion part where the recessed part is not formed.

In at least an embodiment of the present invention, it is preferable that the card reader includes two tip end detection mechanisms which are disposed on both end sides in a width direction of the card perpendicular to a thickness direction of the card inserted into the insertion port and the inserting direction, and the width detection mechanism is structured by using the two tip end detection mechanisms. In this case, the tip end detection mechanism and the width detection mechanism can be structured by using common members and thus a structure of the card reader can be simplified.

As described above, in at least an embodiment of the present invention, in a manual type card reader in which a card formed in a substantially rectangular shape is inserted in its short-side direction, even when data communication can be performed between an IC chip of the card and the card reader, the card inserted into the card reader can be easily pulled out.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4(A) and 4(B) are explanatory front views showing an operation of a width detection mechanism shown in FIG. 3.

FIGS. 5(A), 5(B) and 5(C) are explanatory side views showing operations of a positioning mechanism and a pulling-out prevention mechanism shown in FIG. 1.

DETAILED DESCRIPTION

An embodiment of the present invention will be described below with reference to the accompanying drawings.
(Entire Structure of Card Reader)

Figure 1:
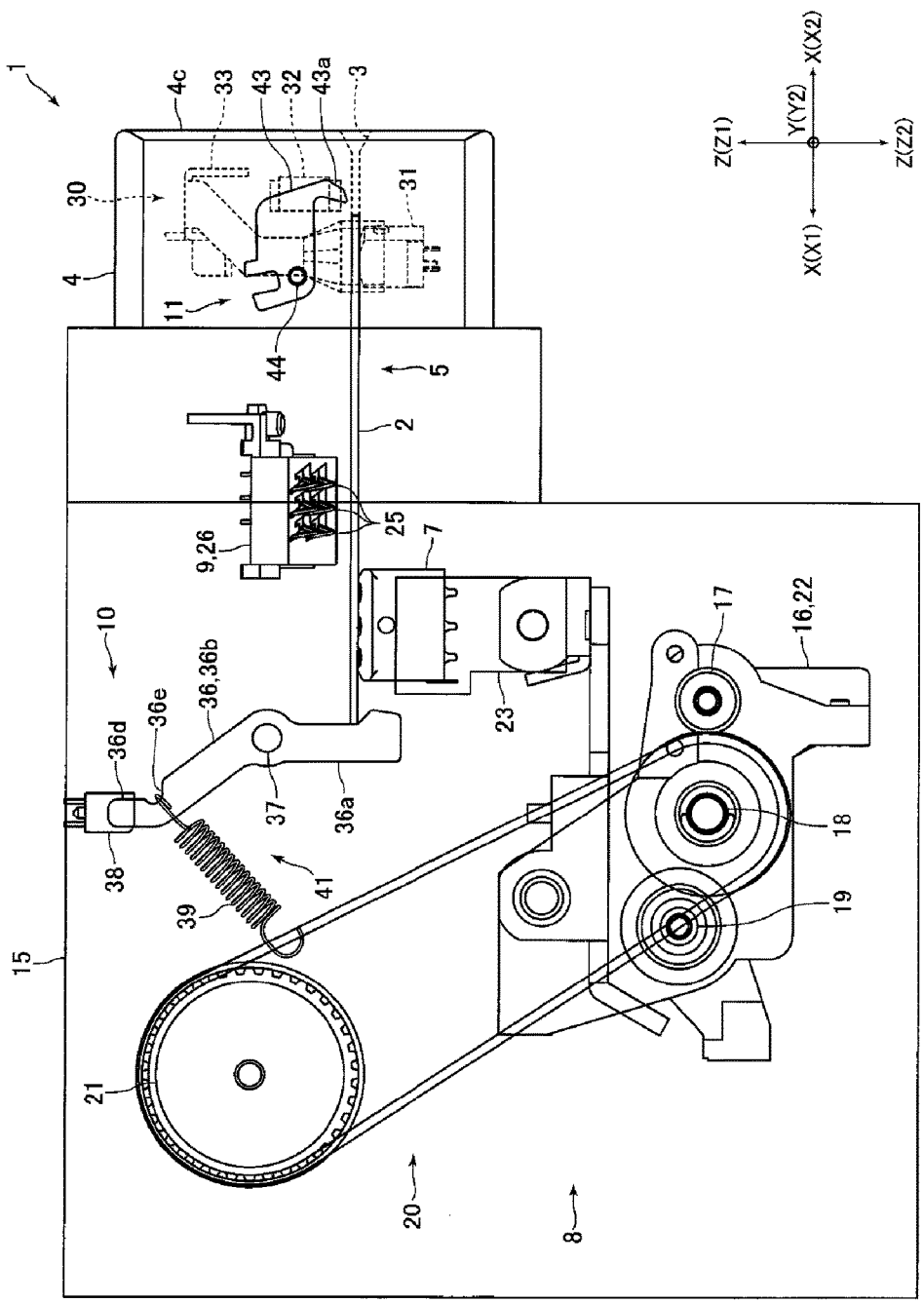
FIG. 1 is an explanatory side view showing a schematic structure of a card reader in accordance with an embodiment of the present invention.
Figure 2:
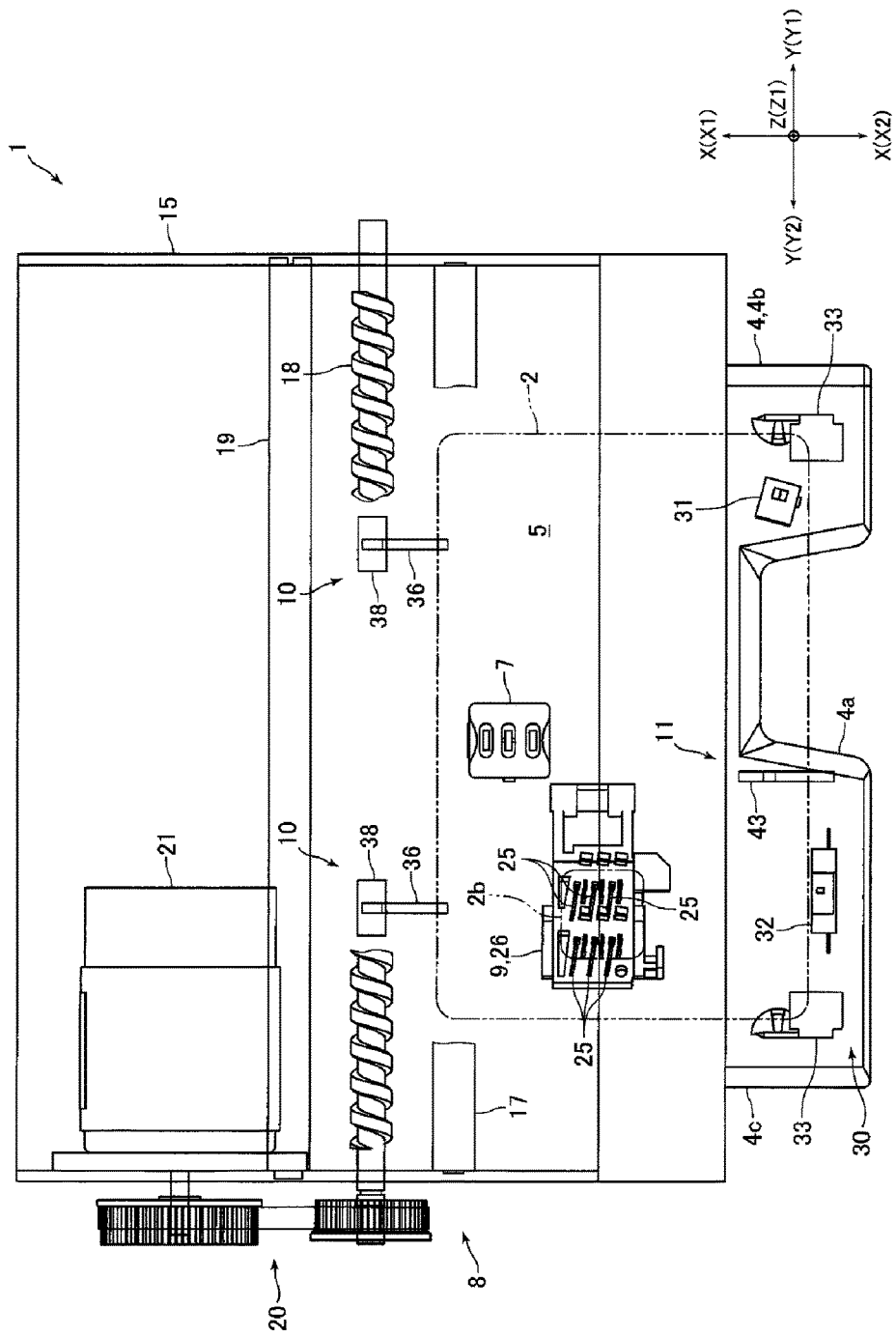
FIG. 2 is an explanatory top view showing a schematic structure of the card reader shown in FIG. 1.
Figure 3:
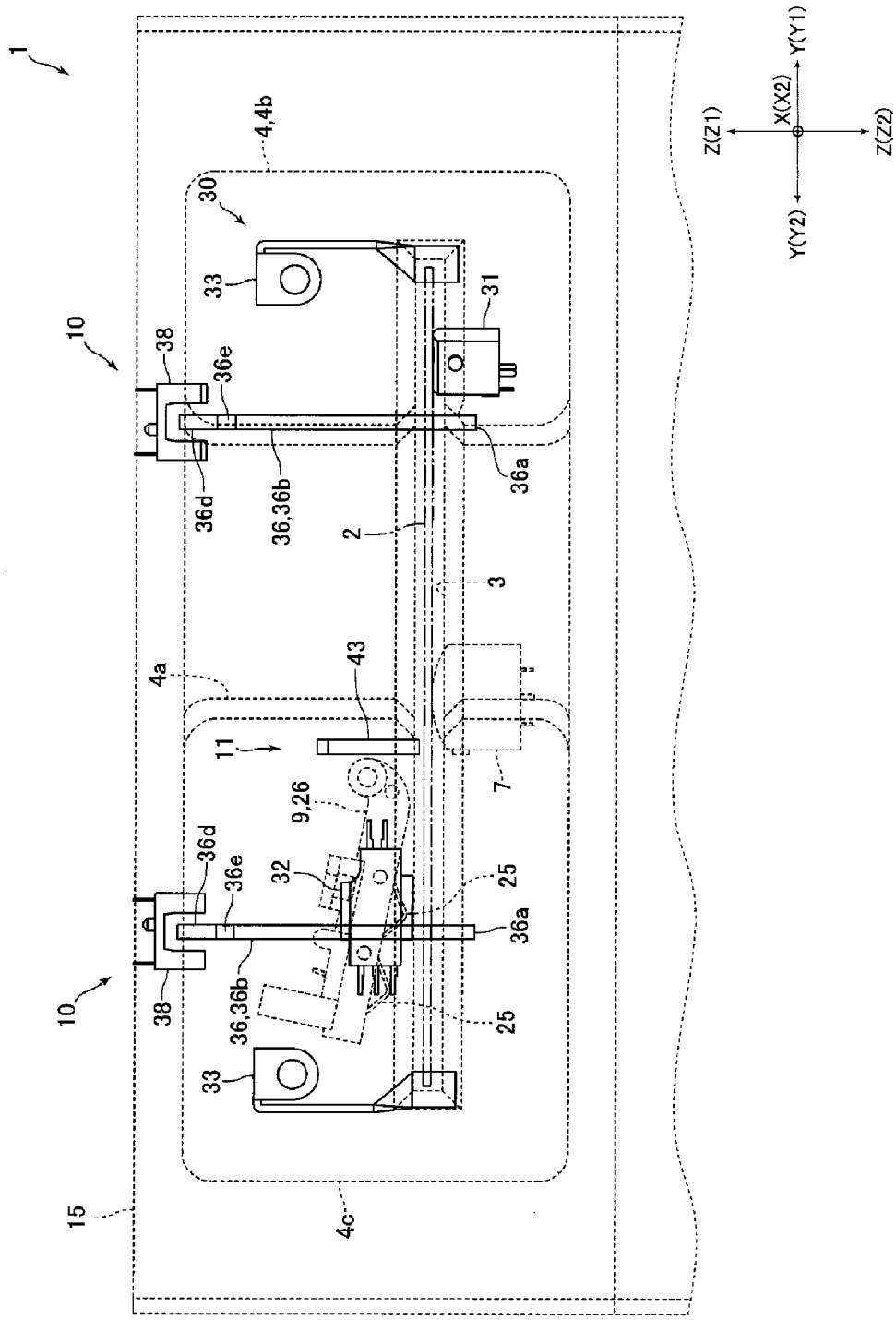
FIG. 3 is an explanatory front view showing a schematic structure of a part of the card reader shown in FIG. 1.
Figure 6:
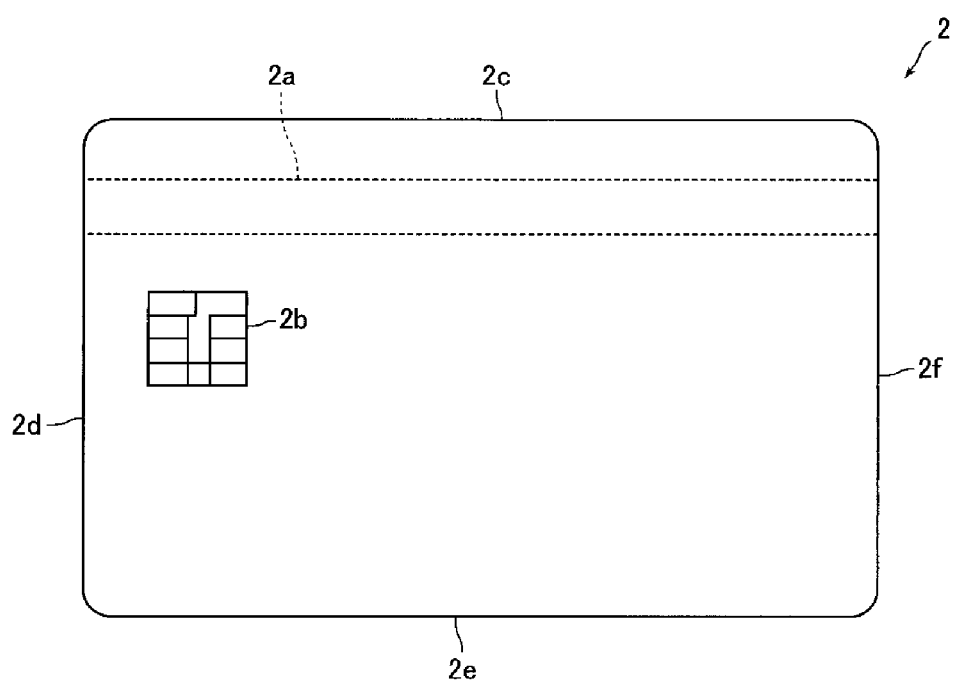
FIG. 6 is a plan view showing a card which is used in the card reader shown in FIG. 1.

FIG. 1 is an explanatory side view showing a schematic structure of a card reader 1 in accordance with an embodiment of the present invention. FIG. 2 is an explanatory top view showing a schematic structure of the card reader 1 shown in FIG. 1. FIG. 3 is an explanatory front view showing a schematic structure of a part of the card reader 1 shown in FIG. 1.

A card reader 1 in this embodiment is a device structured to perform at least one of reading of data recorded in a card 2 and recording of data to the card 2 and is mounted and used in a predetermined host apparatus. The card reader 1 in this embodiment is a manual type card reader in which a user manually inserts a card 2 into an inside of the card reader 1. The card reader 1 is provided with a card insertion part 4 formed with an insertion port 3 into which a card 2 is inserted. An inside of the card reader 1 is formed with a card passage 5 where an inserted card 2 is passed. The card passage 5 is formed so as to be connected with the insertion port 3. Further, the card passage 5 is structured of a guide member not shown and is formed so that a card 2 is moved linearly.

The card reader 1 includes a magnetic head 7 configured to abut with a card 2 to perform reading of magnetic data recorded on a card 2 and/or recording of magnetic data to the card 2, a head moving mechanism 8 structured to move the magnetic head 7 in a direction perpendicular to an inserting direction of the card 2, an IC contact block 9 configured to contact with an external connection terminal 2b formed on the card 2 and perform data communication, a positioning mechanism 10 for positioning the card 2 inserted in an inside of the card reader 1, and a pulling-out prevention mechanism 11 structured to prevent pulling-out of the card 2 inserted in the inside of the card reader 1.

A card 2 is a card made of vinyl chloride whose thickness is about 0.7-0.8 mm and is structured similarly to a card described in Patent Literature 1. A card 2 in this embodiment is a card with a magnetic stripe in conformity with the international standard (for example, ISO/IEC7811) or JIS standard (for example, JISX6302) and is formed in a substantially rectangular shape whose four corners are rounded. A rear face of a card 2 is formed with a magnetic stripe 2a. Further, the card 2 is incorporated with an IC chip (not shown) and a front face of the card 2 is formed with an external connection terminal 2b.

A magnetic stripe 2a is formed in a long and thin strip shape which is parallel to a longitudinal direction of a card 2 formed in a substantially rectangular shape. Further, the magnetic stripe 2a is formed on one end face 2c side in a short-side direction of a card 2. Specifically, based on the international standard or JIS standard, a magnetic stripe 2a is formed within a predetermined range in a short-side direction of a card 2 with one end face 2c as a reference. An external connection terminal 2b is formed on one end face 2d side in a longitudinal direction of a card 2 and at a substantially center position in a short-side direction of the card 2. The external connection terminal 2b is structured of eight connection terminals which are arranged in four lines in the short-side direction of a card 2 and two rows in the longitudinal direction of the card 2.

In the card reader 1 in this embodiment, a card 2 is inserted in an "X1" direction shown in FIG. 1 and the like and the card 2 is ejected in an "X2" direction. In other words, the "X1" direction is an inserting direction of a card 2 and the "X2" direction is an ejecting direction of the card 2. Further, the "X" direction is a passing direction of a card 2. Further, in this embodiment, a card 2 is inserted into the card reader 1 so that a short-side direction of the card 2 and the "X" direction are coincided with each other. In other words, a card 2 is inserted into the card reader 1 in its short-side direction.

A "Y" direction in FIG. 1 and the like perpendicular to the "X" direction is a width direction of the card passage 5 and a longitudinal direction of a card 2 inserted into an inside of the card reader 1 in a correct posture is substantially coincided with the "Y" direction. Further, a "Z" direction in FIG. 1 and the like perpendicular to the "X" direction and the "Y" direction is a thickness direction of a card 2 inserted into the insertion port 3. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", and the "Z" direction is an "upper and lower direction". Further, the "X1" direction side is a "rear (back)" side, the "X2" direction side is a "front" side, the "Y1" direction side is a "right" side, the "Y2" direction side is a "left" side, the "Z1" direction side is an "upper" side, and the "Z2" direction side is a "lower" side.

The magnetic head 7 is disposed in an inside of a main body part 15 of the card reader 1. Further, the magnetic head 7 is disposed on a rear side with respect to the IC contact block 9. A head moving mechanism 8 includes a carriage 16 on which the magnetic head 7 is mounted, a guide shaft 17 configured to guide the carriage 16 in the right and left direction, a lead screw 18 configured to feed the carriage 16 in the right and left direction, and a turning prevention shaft 19 for preventing turning of the carriage 16 around the guide shaft 17. The lead screw 18 is connected with a motor 21 through a power transmission mechanism 20 structured of a pulley and a belt. Further, the head moving mechanism 8 includes a cam plate (not shown) for moving the magnetic head 7 up and down.

The carriage 16 includes, as shown in FIG. 1, a carriage main body 22 and a head holding member 23 which holds the magnetic head 7. The carriage main body 22 is attached with a female screw member engaged with the lead screw 18, a slide bearing engaged with the guide shaft 17, and a slide member engaged with the turning prevention shaft 19. The carriage main body 22 turnably holds the head holding member 23. The head holding member 23 is urged by an urging force of a torsion coil spring not shown in a direction that the magnetic head 7 is moved upward. The head holding member 23 is rotatably attached with a roller (not shown) which abuts with a cam of the cam plate.

The head moving mechanism 8 moves the magnetic head 7 in a right and left direction by the lead screw 18 and the like, and moves the magnetic head 7 up and down between a position where the magnetic head 7 is capable of abutting with a magnetic stripe 2a of a card 2 and a position where the magnetic head 7 is retreated from the card passage 5 by the roller attached to the head holding member 23 and the cam plate. The head moving mechanism 8 in this embodiment makes the magnetic head 7 retreat to a lower side of the card passage 5.

The IC contact block 9 is disposed in an inside of the main body part 15 of the card reader 1. Further, the IC contact block 9 is disposed on a front side with respect to the magnetic head 7. Further, the IC contact block 9 is disposed on a left end side of the card passage 5 in the right and left direction and is disposed to an upper side of the card passage 5. The IC contact block 9 includes a plurality of IC contact springs 25 configured to contact with an external connection terminal 2b of a card 2 and a spring holding member 26 which holds a plurality of the IC contact springs 25.

A contact block moving mechanism not shown is connected with the IC contact block 9. The contact block moving mechanism includes a drive source such as a solenoid and moves the IC contact block 9 between a position where the IC contact springs 25 are capable of contacting with an external connection terminal 2b of a card 2 and a position where the IC contact springs 25 are retreated from the card passage 5. The contact block moving mechanism in this embodiment makes the IC contact springs 25 retreat to an upper side of the card passage 5.

(Structure of Card Insertion Part)

FIGS. 4(A) and 4(B) are explanatory front views showing an operation of a width detection mechanism 30 shown in FIG. 3.

The card insertion part 4 is attached to a front end face of the main body part 15 and structures a front face side portion of the card reader 1. As shown in FIG. 2, the card insertion part 4 is formed with a recessed part 4a which is recessed toward a rear side from a front end face of the card insertion part 4. The recessed part 4a is formed at a middle position of the card insertion part 4 in the right and left direction. A protruded part 4b is formed on a right side of the recessed part 4a and a protruded part 4c is formed on a left side of the recessed part 4a. The protruded parts 4b and 4c are formed in a hollow shape. The card insertion part 4 is arranged with a width detection mechanism 30 structured to detect whether a card 2 is inserted into the insertion port 3 in its short-side direction or inserted into the insertion port 3 in its longitudinal direction, a magnetic head (pre-head) 31 configured to detect a magnetic stripe 2a of a card 2, and a metal detection mechanism 32 structured to detect an external connection terminal 2b of a card 2.

The width detection mechanism 30 includes two detection levers 33 which are disposed on both right and left end sides of the card insertion part 4 and are capable of protruding to and retreating from the card passage 5, and two sensors (not shown) configured to detect respective movements of the two detection levers 33. The sensor is, for example, a transmission type optical sensor having a light emitting element and a light receiving element receiving light from the light emitting element. In a standby state before a card 2 is inserted into the insertion port 3, as shown in FIG. 4(A), parts of the detection levers 33 are disposed in the card passage 5.

In this standby state, when a card 2 is inserted into the insertion port 3 so that a short-side direction of the card 2 is substantially coincided with the front and rear direction, as shown in FIG. 4(B), both right and left end faces of the card 2 are respectively contacted with the two detection levers 33 and thereby the two detection levers 33 are turned. On the other hand, in the standby state, when a card 2 is inserted into the insertion port 3 so that a longitudinal direction of the card 2 is substantially coincided with the front and rear direction, end faces in the right and left direction of the card 2 are not abutted with at least one of the two detection levers 33 and thus at least one of the two detection levers 33 is not turned. Therefore, based on detected results of two sensors, it can be detected whether a card 2 is inserted into the insertion port 3 so that a short-side direction of the card 2 is substantially coincided with the front and rear direction or the card 2 is inserted into the insertion port 3 so that a longitudinal direction of the card 2 is substantially coincided with the front and rear direction. In accordance with an embodiment of the present invention, it is capable of detecting whether a card 2 whose length in its longitudinal direction is in conformity with the international standard or JIS standard is inserted into the insertion port 3 or not based on a detected result of the width detection mechanism 30.

The pre-head 31 is disposed at substantially the same position as the width detection mechanism 30 in the front and rear direction. The pre-head 31 is disposed in an inside of the protruded part 4b formed in a hollow shape and is disposed on a right end side of the card passage 5. Further, the pre-head 31 is disposed so as to face the card passage 5 from a lower side of the card passage 5. Therefore, when a card 2 is inserted into the insertion port 3 so that a short-side direction of the card 2 is substantially coincided with the front and rear direction in a state that a rear face of the card 2 faces a lower side, a magnetic stripe 2a of the card 2 is detected by the pre-head 31. However, even when a card 2 is inserted into the insertion port 3 so that a short-side direction of the card 2 is substantially coincided with the front and rear direction, if the card 2 is inserted into the insertion port 3 in a state that a front face of the card 2 faces a lower side, the magnetic stripe 2a is not detected by the pre-head 31. Therefore, in a case that a card 2 is inserted into the insertion port 3 so that a short-side direction of the card 2 is substantially coincided with the front and rear direction, it can be detected based on a detected result of the pre-head 31 whether the card 2 is inserted in a state that its front face faces an upper side or inserted in a state that its rear face faces an upper side.

In this embodiment, as shown in FIG. 2, the pre-head 31 is disposed so that a direction in which a magnetic gap of the pre-head 31 is formed is inclined with respect to the right and left direction. Therefore, when a card 2 is inserted into the insertion port 3 so that a short-side direction of the card 2 is substantially coincided with the front and rear direction in a state that a rear face of the card 2 faces a lower side, it can be detected whether magnetic data are recorded in a magnetic stripe 2a or not based on a detected result of the pre-head 31.

The metal detection mechanism 32 is a magnetic type sensor which includes an excitation coil, a detection coil and a core around which the excitation coil and the detection coil are wound. The metal detection mechanism 32 is disposed slightly on a front side with respect to the width detection mechanism 30 and the pre-head 31 in the front and rear direction. Further, the metal detection mechanism 32 is disposed in an inside of the protruded part 4c formed in a hollow shape and is disposed on a left end side of the card passage 5. In addition, in the right and left direction, the metal detection mechanism 32 is disposed at a position where an external connection terminal 2b of a card 2 is passed when the card 2 is inserted into the insertion port 3 so that a short-side direction of the card 2 is substantially coincided with the front and rear direction and that one end face 2d in a longitudinal direction of the card 2 is disposed on the left side. Therefore, when a card 2 is inserted into the insertion port 3 so that a short-side direction of the card 2 is substantially coincided with the front and rear direction and that one end face 2d in a longitudinal direction of the card 2 is disposed on the left side, an external connection terminal 2b is detected by the metal detection mechanism 32. However, even in a case that a card 2 is inserted into the insertion port 3 so that a short-side direction of the card 2 is substantially coincided with the front and rear direction, when the card 2 is inserted into the insertion port 3 so that the other end face 2f in a longitudinal direction of the card 2 is disposed on the left side, an external connection terminal 2b is not detected by the metal detection mechanism 32. Therefore, in a case that a card 2 is inserted into the insertion port 3 so that a short-side direction of the card 2 is substantially coincided with the front and rear direction, it can be detected based on a detected result of the metal detection mechanism 32 whether a card 2 is inserted so that one end face 2d is disposed on a left side, or a card 2 is inserted so that the other end face 2f is disposed on a left side.

The metal detection mechanism 32 is disposed on an upper side of the card passage 5. Therefore, a signal level of an output signal of the metal detection mechanism 32 when a card 2 is inserted from one end face 2c side into the insertion port 3 so that a short-side direction of the card 2 is substantially coincided with the front and rear direction in a state that a front face of the card 2 faces an upper side is different from a signal level of an output signal of the metal detection mechanism 32 when a card 2 is inserted from the other end face 2e side into the insertion port 3 so that a short-side direction of the card 2 is substantially coincided with the front and rear direction in a state that a rear face of the card 2 faces an upper side. Therefore, in a case that a card 2 is inserted into the insertion port 3 so that a short-side direction of the card 2 is substantially coincided with the front and rear direction and that one end face 2d is disposed on a left side, it can be detected based on a detected result of the metal detection mechanism 32 whether the card 2 is inserted in a state that its front face faces an upper side, or the card 2 is inserted in a state that its rear face faces an upper side.

In this embodiment, a case that a card 2 is inserted in a correct posture is that a card 2 is inserted from one end face 2c side in the short-side direction of the card 2 into the insertion port 3 (in other words, in a state that one end face 2d in a longitudinal direction of the card 2 is disposed on a left side) so that a short-side direction of the card 2 is coincided with the front and rear direction in a state that a front face of the card 2 faces an upper side. As described above, based on a detected result of the width detection mechanism 30, it can be detected whether a card 2 is inserted into the insertion port 3 so that its short-side direction is substantially coincided with the front and rear direction or not. Further, based on a detected result of the metal detection mechanism 32, in a case that a card 2 is inserted into the insertion port 3 so that a short-side direction of the card 2 is substantially coincided with the front and rear direction, it can be detected whether the card 2 is inserted so that one end face 2d is disposed on a left side or not. In addition, based on a detected result of the pre-head 31 and a detected result of the metal detection mechanism 32, in a case that a card 2 is inserted into insertion port 3 so that a short-side direction of the card 2 is substantially coincided with the front and rear direction and that one end face 2d is disposed on a left side, it can be detected whether a card 2 is inserted in a state that its front face faces an upper side or not.

Therefore, according to this embodiment, based on detected results of the width detection mechanism 30, the pre-head 31 and the metal detection mechanism 32, it can be detected whether a card 2 is inserted into the insertion port 3 in a correct posture or not. In this embodiment, an insertion posture detection mechanism for detecting that a card 2 is inserted into the insertion port 3 in a correct posture is structured of the width detection mechanism 30, the pre-head 31 and the metal detection mechanism 32. Further, in this embodiment, the pre-head 31 and/or the metal detection mechanism 32 is a front/rear face detection mechanism for detecting whether a front face of a card 2 inserted into the insertion port 3 faces upward or its rear face faces upward.

(Structure of Positioning Mechanism)

FIGS. 5(A), 5(B) and 5(C) are explanatory side views showing operations of a positioning mechanism 10 and a pulling-out prevention mechanism 11 shown in FIG. 1.

A positioning mechanism 10 is disposed in an inside of the main body part 15 of the card reader 1. The positioning mechanism 10 includes a positioning member 36 formed with an abutting part 36a configured to abut with a rear end face (in other words, a tip end face in an inserting direction) of a card 2 inserted into the card reader 1, a support shaft 37 which turnably supports the positioning member 36, a sensor 38 for detecting movement of the positioning member 36, and a tension coil spring 39 which urges the positioning member 36. The sensor 38 is, for example, a transmission type optical sensor having a light emitting element and a light receiving element for receiving light from the light emitting element. In this embodiment, two positioning mechanisms 10 are separately disposed from each other with a predetermined space therebetween in the right and left direction. Specifically, the positioning mechanism 10 is disposed on each of both right and left end sides of the card passage 5. In FIGS. 2 and 3, the support shaft 37 and the tension coil spring 39 are not shown.

The positioning member 36 is formed in a flat plate shape. The positioning member 36 is, in addition to the abutting part 36a, provided with an arm part 36b which is extended toward a substantially upper side from an upper end of the abutting part 36a. The support shaft 37 is fixed to a frame of the main body part 15 so that its axial direction and the right and left direction are coincided with each other. The positioning member 36 is turnably held by the support shaft 37 in a boundary part between the abutting part 36a and the arm part 36b. In this embodiment, a turning range of the positioning member 36 is restricted by a stopper member not shown.

The abutting part 36a is formed in a long and thin substantially rectangular shape in the upper and lower direction. The abutting part 36a is disposed on a rear side with respect to the magnetic head 7 in the front and rear direction. A front end side of the abutting part 36a is formed with a support part 36c configured to support a card 2 abutting with the abutting part 36a from an under face side. An upper end side of the arm part 36b is formed with a light intercepting part 36d configured to intercept light between the light emitting element and the light receiving element of the sensor 38. A lower side of the light intercepting part 36d is formed with a spring engaging part 36e with which one end of the tension coil spring 39 is engaged. The other end of the tension coil spring 39 is fixed to a frame of the main body part 15.

In this embodiment, when a card 2 is not abutted with the abutting part 36a, the positioning member 36 is urged in a counterclockwise direction in FIG. 5(A) with the support shaft 37 as a center by an urging force of the tension coil spring 39 (see FIG. 5(A)). In this state, when a rear end face of the card 2 inserted into the insertion port 3 is abutted with the abutting part 36a, as shown in FIGS. 5(B) and 5(C), the abutting part 36a is pressed by the card 2 and the positioning member 36 is turned in a clockwise direction in FIGS. 5(B) and 5(C) with the support shaft 37 as a center and is abutted with a stopper member not shown. When the positioning member 36 is abutted with the stopper, the card 2 is positioned in the front and rear direction.

As shown in FIG. 5(A), when a card 2 is not abutted with the abutting part 36a, the light intercepting part 36d is separated from a position between the light emitting element and the light receiving element of the sensor 38. On the other hand, as shown in FIGS. 5(B) and 5(C), when a rear end face of the card 2 is abutted with the abutting part 36a, the light intercepting part 36d intercepts light from the light emitting element to the light receiving element of the sensor 38. Therefore, based on a detected result of the sensor 38, it is detected that a card 2 is positioned at a predetermined position in the front and rear direction.

In a case that a card 2 is inserted into the insertion port 3 so that a short-side direction of the card 2 and the front and rear direction are coincided with each other, the card 2 is positioned by two positioning members 36 as shown in FIG. 2. In other words, in this case, a front end face of the card 2 is located on a rear side with respect to a front end face of the card insertion part 4 (in other words, the front end face of the card 2 is located on a rear side with respect to a front end face of the card reader 1), and a part of the front end side of the card 2 is exposed in the recessed part 4a but, in the protruded parts 4b and 4c, the front end side of the card 2 is accommodated in the insides of the protruded parts 4b and 4c. Further, in this case, a center of the recessed part 4a in the front and rear direction and the position of the front end face of the card 2 are substantially coincided with each other. Further, in this time, a user who inserts a card 2 into the card reader 1 is capable of grasping a part of the front end side of the card 2 exposed in the recessed part 4a but there is hardly a grasping margin of the card 2.

The positioning mechanism 10 in this embodiment functions as a tip end detection mechanism for detecting that a rear end face of a card 2 has been inserted to a predetermined position. Specifically, the positioning mechanism 10 functions as a tip end detection mechanism for detecting that a rear end face of the card 2 has been inserted to a position where the magnetic head 7 is capable of abutting with a magnetic stripe 2a and the IC contact springs 25 are capable of contacting with an external connection terminal 2b. Further, the positioning member 10 in this embodiment is an abutting member having an abutting part 36a which is moved to a rear side when a rear end face of a card 2 is abutted. Further, as described above, the positioning member 36 is urged by an urging force of the tension coil spring 39 in the counterclockwise direction in FIGS. 5(B) and 5(C) with the support shaft 37 as a center and thus force pushing back the abutted card 2 to a front direction is applied to the abutting part 36a. The tension coil spring 39 in this embodiment is an urging member which urges the positioning member 36 that is an abutting member so that the abutting part 36a pushes back a card 2 to a front direction. Further, in this embodiment, the positioning member 36, the support shaft 37 and the tension coil spring 39 structure a pushing-out mechanism 41 structured to push out a card 2 inserted into an inside of the card reader 1 in a front direction.

(Structure of Pulling-out Prevention Mechanism)

A pulling-out prevention mechanism 11 includes a pulling-out prevention member 43 configured to contact with a front end face of a card 2 inserted into an inside of the card reader 1 and prevent pulling-out of the card 2, a support shaft 44 which turnably supports the pulling out prevention member 43, and a solenoid 45 as a drive source configured to turn the pulling-out prevention member 43 with the support shaft 44 as a center. In FIGS. 1 through 3, the solenoid 45 is not shown. Further, in FIGS. 2 and 3, the support shaft 44 is not shown.

The pulling-out prevention member 43 is formed in a flat plate shape. The pulling-out prevention member 43 is disposed in an inside of the protruded part 4c formed in a hollow shape. Further, the pulling-out prevention member 43 is disposed just on a left side of the recessed part 4a and is disposed between two positioning members 36 in the right and left direction. In addition, the pulling-out prevention member 43 is disposed on an upper side of the card passage 5. The pulling-out prevention member 43 is provided with a contact part 43a configured to contact with a front end face of a card 2. The contact part 43a is formed on the front end side of the pulling-out prevention member 43. Further, the contact part 43a is formed in a hook shape protruding to a lower direction.

The support shaft 44 is fixed to a frame of the card insertion part 4 so that its axial direction and the right and left direction are coincided with each other. The support shaft 44 supports a rear end side portion of the pulling-out prevention member 43. As shown in FIGS. 5(A), 5(B) and 5(C), an upper side portion with respect to the support shaft 44 of the pulling-out prevention member 43 is formed with a cut-out groove 43b. A main body of the solenoid 45 is fixed to a frame of the main body part 15. A pin 46 is fixed to a plunger of the solenoid 45. The pin 46 is engaged with the cut-out groove 43b. In accordance with an embodiment of the present invention, the pulling-out prevention member 43 and a plunger of the solenoid 45 may be connected with each other through a predetermined link mechanism.

In this embodiment, for example, in a state that electric power is not supplied to the solenoid 45, as shown in FIGS. 5(A) and 5(C), the pulling-out prevention member 43 is urged in a counterclockwise direction in FIGS. 5(A) and 5(C) with the support shaft 44 as a center by an urging member of a tension coil spring not shown. In this state, when electric power is supplied to the solenoid 45, as shown in FIG. 5(B), the pulling-out prevention member 43 is turned in a clockwise direction in FIG. 5(B) with the support shaft 44 as a center and the contact part 43a is contacted with a front end face of the card 2. When the contact part 43a is contacted with the front end face of the card 2, pulling-out of the card 2 inserted into the inside of the card reader 1 is prevented.

In a state that the contact part 43*a* is contacted with a front end face of the card 2, force pushing back the card 2 to a front direction is applied to the abutting part 36*a* of the positioning member 36 by an urging force of the tension coil spring 39. Therefore, the front end face of the card 2 is contacted with the contact part 43*a* at a predetermined contact pressure and the rear end face of the card 2 is contacted with the abutting part 36*a* at a predetermined contact pressure.

(Schematic Operation of Card Reader)

In the card reader 1 structured as described above, in a standby state before a card 2 is inserted into the insertion port 3, the magnetic head 7 is located at a position retreated from the card passage 5 and the IC contact block 9 is located at a retreated position retreated from the card passage 5. Further, in this standby state, electric power is not supplied to the solenoid 45.

In this standby state, a card 2 is inserted into the insertion port 3 and, when it is detected that the card 2 is inserted into the insertion port 3 in a correct posture based on detected results of the width detection mechanism 30, the pre-head 31 and the metal detection mechanism 32 and, in addition, when it is detected that a rear end face of the card 2 has been inserted to the predetermined position by the two positioning mechanisms 10 respectively, (in other words, lights between the light emitting elements and the light receiving elements of two sensors 38 are respectively intercepted by the respective light intercepting parts 36*d*), the solenoid 45 is activated and the pulling-out prevention member 43 prevents pulling-out of the card 2 inserted into the inside of the card reader 1.

When it is confirmed that pulling-out of the card 2 is prevented by the pulling-out prevention member 43, the magnetic head 7 is moved in the right and left direction while abutting with a magnetic stripe 2*a* of the card 2 to perform reading and/or recording of magnetic data. Further, the IC contact springs 25 are contacted with an external connection terminal 2*b* of the card 2 to perform data communication between an IC chip of the card 2 and the card reader 1. When predetermined processing such as recording of data is finished in the inside of the card reader 1, the pulling-out prevention state of the card 2 by the pulling-out prevention mechanism 11 is released. When the pulling-out prevention state of the card 2 by the pulling-out prevention mechanism 11 is released, the abutting part 36*a* of the positioning member 36 urged by the tension coil spring 39 pushes out the card 2 in a front direction.

On the other hand, in a standby state, even when a card 2 is inserted into insertion port 3, in a case that it is detected that the card 2 is inserted into the insertion port 3 in a wrong posture based on detected results of the width detection mechanism 30, the pre-head 31 and the metal detection mechanism 32 or, in a case that at least one of two positioning mechanisms 10 does not detect that a rear end face of the card 2 has been inserted to the predetermined position, the solenoid 45 is not activated and pulling-out of the card 2 inserted into the inside of the card reader 1 is not prevented. Therefore, in this case, the abutting part 36*a* of the positioning member 36 urged by the tension coil spring 39 pushes out the inserted card 2 in a front direction.

(Principal Effects in this Embodiment)

As described above, in this embodiment, predetermined processing such as communication of data between an IC chip of a card 2 and the card reader 1 is finished and, when the pulling-out prevention state of the card 2 by the pulling-out prevention mechanism 11 is released, the abutting part 36*a* of the positioning member 36 urged by the tension coil spring 39 pushes out the card 2 in a front direction. Therefore, in this embodiment, even when a card 2 is inserted to a rear side of the card reader 1 for contacting an external connection terminal 2*b* formed at a substantially center position of the card 2 in a short-side direction of the card 2 with the IC contact springs 25 disposed in the inside of the main body part 15 of the card reader 1, (specifically, even when the card 2 is inserted in a state that a part on a front end side of the card 2 is exposed in the recessed part 4*a* but, in the protruded parts 4*b* and 4*c*, the front end side of the card 2 is accommodated in the insides of the protruded parts 4*b* and 4*c*), a user is capable of easily pulling out the card 2 which is pushed out in the front direction after processing in the inside of the card reader 1 is finished. In other words, after processing in the inside of card reader 1 is finished, a user is capable of easily pulling out a card 2 having been inserted into the card reader 1. Therefore, according to this embodiment, a manual type card reader 1 in which a card 2 formed in a substantially rectangular shape is inserted in its short-side direction, even when data communication can be performed between an IC chip of the card 2 and the card reader 1, the card 2 inserted into the card reader 1 can be easily pulled out.

In this embodiment, when it is detected that a card 2 is inserted into the insertion port 3 in a correct posture based on detected results of the width detection mechanism 30, the pre-head 31 and the metal detection mechanism 32 and, in addition, when it is detected that a rear end face of the card 2 has been inserted to the predetermined position by the two positioning mechanisms 10 respectively, the solenoid 45 is activated and the pulling-out prevention mechanism 11 prevents pulling-out of the card 2 inserted into the inside of the card reader 1. Therefore, according to this embodiment, when performing reading and/or recording of magnetic data by the magnetic head 7 and, when performing data communication between an IC chip of a card 2 and the card reader 1 by contacting the IC contact springs 25 with an external connection terminal 2*b*, pulling-out of the card 2 can be prevented. Accordingly, in this embodiment, appropriate reading and/or recording of magnetic data by the magnetic head 7 can be performed and, in addition, appropriate data communication can be performed between an IC chip of the card 2 and the card reader 1.

In this embodiment, in a case that it is detected that the card 2 is inserted into the insertion port 3 in a wrong posture based on detected results of the width detection mechanism 30, the pre-head 31 and the metal detection mechanism 32 or, in a case that at least one of two positioning mechanisms 10 does not detect that a rear end face of the card 2 has been inserted to the predetermined position, pulling-out of the card 2 is not prevented by the pulling-out prevention mechanism 11 and the pushing-out mechanism 41 pushes the card 2 in the front direction. In other words, in this embodiment, in a case that a card 2 is inserted into the insertion port 3 in a wrong posture or, in a case that a rear end face of the card 2 has not been inserted to a predetermined position, the card 2 is pushed out by the pushing-out mechanism 41 in the front direction. Therefore, according to this embodiment, a situation that a card 2 has been inserted into the insertion port 3 in a wrong posture, or a situation that a rear end face of the card 2 has not inserted to a predetermined position can be notified to a user who has inserted the card 2.

In this embodiment, two positioning mechanisms 10 are separately disposed from each other with a predetermined space therebetween in the right and left direction. Therefore, according to this embodiment, it can be detected by the two positioning mechanisms 10 whether a short-side direction of the inserted card 2 is inclined with respect to the front and rear direction or not. Further, in this embodiment, in a case that a short-side direction of an inserted card 2 is inclined with respect to the front and rear direction, and that one positioning mechanism 10 detects that a rear end face of the card 2 has been inserted to a predetermined position but that the other positioning mechanism 10 does not detect that the rear end face of the card 2 has been inserted to the predetermined position, pulling-out of the card 2 is not prevented by the pulling-out prevention mechanism 11 and the pushing-out mechanism 41 pushes out the card 2 in the front direction. Therefore, according to this embodiment, a user can be notified that a card 2 is required to be inserted again so that a short-side direction of the card 2 does not incline with respect to the front and rear direction. Further, when a card 2 is inserted again so that a short-side direction of the card 2 does not incline with respect to the front and rear direction, an external connection terminal 2b and the IC contact springs 25 can be contacted surely to perform data communication appropriately between an IC chip of the card 2 and the card reader 1 and magnetic data can be appropriately recorded in a magnetic stripe 2a by the magnetic head 7.

In this embodiment, the pushing-out mechanism 41 structured to push out a card 2 inserted into an inside of the card reader 1 is structured of the positioning member 36, the support shaft 37 and the tension coil spring 39 structuring the positioning mechanism 10. In other words, in this embodiment, a part of the positioning mechanism 10 and the pushing-out mechanism 41 are structured by using common members. Therefore, according to this embodiment, a structure of the card reader 1 can be simplified.

In this embodiment, the card insertion part 4 is formed with the recessed part 4a which is recessed toward a rear side from a front end face of the card insertion part 4. Therefore, according to this embodiment, even when a card 2 is inserted to a rear side of the card reader 1 so that a short-side direction of the card 2 and the front and rear direction are coincided with each other, a user easily pushes the card 2 to a rear side of the card reader 1 by utilizing the recessed part 4a. Further, in this embodiment, the protruded parts 4b and 4c are formed on both right and left sides of the recessed part 4a and thus the width detection mechanism 30, the pre-head 31, the metal detection mechanism 32, the pulling-out prevention member 43 and the like can be disposed in the protruded parts 4b and 4c.

(Other Embodiments)

Although the present invention has been shown and described with reference to a specific embodiment, various changes and modifications will be apparent to those skilled in the art from the teachings herein.

In the embodiment described above, the positioning member 36 is urged by a tension coil spring 39, but the positioning member 36 may be urged by another spring member such as a torsion coil spring. Further, in the embodiment described above, the positioning member 36 is capable of turning with the support shaft 37 as a center, but the positioning member 36 may be moved linearly in the front and rear direction. In this case, for example, the positioning member 36 is urged in a front direction by an urging member such as a compression coil spring.

In the embodiment described above, the positioning mechanism 10 includes the sensor 38, but the positioning mechanism 10 may include no sensor 38. In this case, a tip end detection mechanism is separately arranged for detecting that a rear end face of a card 2 has been inserted to a predetermined position. For example, as a tip end detection mechanism, a transmission type optical sensor structured of a light emitting element and a light receiving element disposed so as to interpose the card passage 5 in the upper and lower direction may be arranged, or a mechanical sensor may be arranged so as to contact with a rear end face of a card 2. In this case, for example, a positioning mechanism 10 having no sensor 38 functions as the pushing-out mechanism 41. As described above, a part of the tip end detection mechanism and the pushing-out mechanism 41 may not be structured of common components.

In the embodiment described above, the pushing-out mechanism 41 is structured of the positioning member 36, the support shaft 37 and the tension coil spring 39 which structure the positioning mechanism 10. However, in addition to the positioning member 36, the support shaft 37 and the tension coil spring 39, a pushing-out mechanism may be arranged separately for pushing out a card 2 inserted into the inside of the card reader 1 in the front direction. In this case, for example, a pushing-out mechanism includes a pushing-out member configured to contact with a card 2 and push out the card 2 in the front direction and a drive source such as a motor or a solenoid configured to drive the pushing-out member in the front and rear direction. Alternatively, in this case, for example, a pushing-out mechanism includes a pushing-out member configured to contact with a card 2 and push out the card 2 in the front direction, an urging member which urges the pushing-out member in the front direction, a lock mechanism structured to lock the pushing-out member having been pushed to the rear side, and a drive source such as a motor or a solenoid configured to release a locking state of the pushing-out member by the lock mechanism.

In the embodiment described above, the pre-head 31 for detecting a magnetic stripe 2a is disposed in the card insertion part 4. However, the present invention is not limited to this embodiment. For example, a magnetic sensor such as a flux gate sensor for detecting a magnetic stripe 2a may be disposed in the card insertion part 4. Further, in the embodiment described above, the pre-head 31 is disposed in the card insertion part 4, but no pre-head 31 may be disposed in the card insertion part 4. Further, in the embodiment described above, an insertion posture detection mechanism for detecting that a card 2 is inserted into the insertion port 3 in a correct posture is structured of the width detection mechanism 30, the pre-head 31 and the metal detection mechanism 32. However, in a case that it is not required to detect a front/rear face of a card 2, an insertion posture detection mechanism for detecting that a card 2 is inserted into the insertion port 3 in a correct posture may be structured only by the width detection mechanism 30.

In the embodiment described above, the pulling-out prevention mechanism 11 includes the pulling-out prevention member 43 configured to contact with a front end face of the card 2 and prevent pulling-out of the card 2. However, the present invention is not limited to this embodiment. For example, instead of the pulling-out prevention member 43, the pulling-out prevention mechanism 11 may include a holding member configured to hold a card 2 so as to sandwich both faces of the card 2 in an upper and lower direction and prevent pulling-out of the card 2. Further, in the embodiment described above, the pulling-out prevention member 43 is supported by the support shaft 44 which is turnable with the right and left direction as an axial direction of turning. However, the pulling-out prevention member 43 may be turnable with the front and rear direction as an axial direction of turning or may be movable in the upper and lower direction. Further, in the embodiment described above, a drive source for turning the pulling-out prevention member 43 is a solenoid 45. However, a drive source for turning the pulling-out prevention member 43 may be a motor.

In the embodiment described above, two positioning mechanisms 10 are separately disposed with a predetermined space therebetween in the right and left direction. However, the present invention is not limited to this embodiment. For example, three or more positioning mechanisms 10 may be separately disposed with a predetermined space therebetween in the right and left direction or one positioning mechanism 10 may be disposed.

In the embodiment described above, a shutter member for closing the card passage 5 and a shutter drive mechanism for driving the shutter member may be arranged in the card insertion part 4. In this case, for example, in a standby state before a card 2 is inserted into the insertion port 3, the shutter member closes the card passage 5. Further, in this case, when it is detected that a card 2 is inserted into the insertion port 3 so that a short-side direction of the card 2 is substantially coincided with the front and rear direction based on a detected result of the width detection mechanism 30, the shutter member opens the card passage 5. On the other hand, when it is detected that a card 2 is inserted into the insertion port 3 so that a longitudinal direction of the card 2 is substantially coincided with the front and rear direction based on a detected result of the width detection mechanism 30, the shutter member maintains a state that the card passage 5 is closed.

In the embodiment described above, a backup power source may be arranged for supplying electric power to the solenoid 45 when power supply is interrupted. Further, for example, the pulling-out prevention mechanism 11 may be structured so as to manually release a state that the contact part 43a of the pulling-out prevention member 43 is contacted with a front end face of a card 2 by using a long and thin pin or the like. In this case, even when power supply is interrupted in a case that the contact part 43a of the pulling-out prevention member 43 is contacted with a front end face of a card 2, a state that the contact part 43a is contacted with the front end face of the card 2 can be released and the card 2 can be pulled out from the inside of the card reader 1.

In the embodiment described above, it may be detected whether a card 2 is inserted into the insertion port 3 so that a short-side direction of the card 2 is substantially coincided with the front and rear direction, or the card 2 is inserted into the insertion port 3 so that a longitudinal direction of the card 2 is substantially coincided with the front and rear direction by using two positioning mechanisms 10 separately disposed with a predetermined space therebetween in the right and left direction. In other words, the two positioning mechanisms 10 may be utilized as a width detection mechanism for detecting whether a card 2 is inserted into the insertion port 3 in its short-side direction, or the card 2 is inserted into the insertion port 3 in its longitudinal direction. In this case, the width detection mechanism 30 is not required to provide separately and thus a structure of the card reader 1 can be simplified.

In the embodiment described above, a card 2 is a rectangular card made of vinyl chloride whose thickness is about 0.7-0.8 mm. However, the present invention is not limited to this embodiment. For example, a card 2 may be a PET (polyethylene terephthalate) card whose thickness is about 0.18-0.36 mm and may be a paper card having a predetermined thickness. Further, in the embodiment described above, a magnetic stripe 2a is formed on a card 2, but no magnetic stripe 2a may be formed on a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card comprising an IC chip having an external connection terminal and formed in a substantially rectangular shape, the card being inserted in a short-side direction of the card, the card reader comprising:
    an IC contact block comprising an IC contact spring configured to contact with the external connection terminal of the IC chip formed on the card;
    an insertion port into which the card is inserted;
    an insertion posture detection mechanism structured to detect that the card is inserted into the insertion port in a correct posture;
    a tip end detection mechanism structured to detect that a tip end face of the card in an inserting direction of the card has been inserted to a predetermined position;
    a pulling-out prevention mechanism structured to prevent pulling-out of the card inserted in an inside of the card reader when it is detected that the card is inserted into the insertion port in a correct posture based on a detected result of the insertion posture detection mechanism and, when it is detected that the tip end face of the card in the inserting direction has been inserted to the predetermined position based on a detected result of the tip end detection mechanism; and
    a pushing-out mechanism structured to push out the card inserted into the inside of the card reader in an ejecting direction of the card which is an opposite direction of the inserting direction;
    wherein the tip end detection mechanism comprises two tip end detection mechanism which are separately disposed with a predetermined space therebetween in a width direction of the card perpendicular to thickness direction of the card inserted into the insertion port and the inserting direction;
    wherein the pulling-out prevention mechanism does not prevent pulling-out of the card and the pushing-out mechanism pushes the card in the ejecting direction in a case that one of the two tip end detection mechanism detects that the tip end face of the card has been inserted to the predetermined position but that the other of the two tip end detection mechanisms does not detect that the tip end face of the card has been inserted to the predetermined position; and
    wherein the pulling-out prevention mechanism prevents pulling-out of the card when it is detected that the tip end face of the card has been inserted to a predetermined position by both of the two tip end detection mechanisms.

2. The card reader according to claim 1, wherein the tip end detection mechanism comprises:
    an abutting member comprising an abutting part which is moved to an inserting direction side when a tip end face of the card in the inserting direction is abutted;
    a sensor configured to detect movement of the abutting member; and an urging member structured to urge the abutting member so that the abutting part pushes the card in the ejecting direction; and
at least a part of the pushing-out mechanism is structured of the abutting member and the urging member.

3. The card reader according to claim 1, wherein
the insertion posture detection mechanism comprises:
a width detection mechanism structured to detect whether the card is inserted into the insertion port in its short-side direction or not; and
a front/rear face detection mechanism structured to detect whether a front face of the card inserted into the insertion port faces upward or its rear face faces upward.

4. The card reader according to claim 3, wherein
the card comprises a magnetic stripe, and
the front/rear face detection mechanism comprises at least one of a magnetic head or a magnetic sensor configured to detect the magnetic stripe and a metal detection mechanism structured to detect the external connection terminal.

5. The card reader according to claim 3, wherein
the two tip end detection mechanisms are disposed on both end sides in a width direction of the card, and
the width detection mechanism comprises the two tip end detection mechanisms.

6. The card reader according to claim 5, wherein
the tip end detection mechanism comprises:
an abutting member comprising an abutting part which is moved to an inserting direction side when a tip end face of the card in the inserting direction is abutted;
a sensor configured to detect movement of the abutting member; and
an urging member structured to urge the abutting member so that the abutting part pushes the card in the ejecting direction; and
at least a part of the pushing-out mechanism is structured of the abutting member and the urging member.

7. The card reader according to claim 5, wherein
the card comprises a magnetic stripe, and
the front/rear face detection mechanism comprises at least one of a magnetic head or a magnetic sensor configured to detect the magnetic stripe and a metal detection mechanism structured to detect the external connection terminal.

8. The card reader according to claim 5, wherein the pulling-out prevention mechanism comprises a pulling-out prevention member configured to contact with an end face on an ejecting direction side of the card and prevent pulling-out of the card.

9. The card reader according to claim 5, wherein the card insertion part formed with the insertion port comprises a recessed part which is recessed from an end face on an ejecting direction side of the card insertion part toward an inserting direction side.

10. The card reader according to claim 1, wherein the pulling-out prevention mechanism comprises a pulling-out prevention member configured to contact with an end face on an ejecting direction side of the card and prevent pulling-out of the card.

11. The card reader according to claim 1, wherein the card insertion part formed with the insertion port comprises a recessed part which is recessed from an end face on an ejecting direction side of the card insertion part toward an inserting direction side.

12. The card reader according to claim 1, wherein
the pulling-out prevention mechanism comprises:
a pulling-out prevention member configured to contact with an end face on an ejecting direction side of the card and prevent pulling-out of the card; and
a drive source configured to move the pulling-out prevention member, and
the drive source is driven when both of the two tip end detection mechanisms detect that the tip end face of the card has been inserted to the predetermined position and thereby the pulling-out prevention member prevents pulling-out of the card having been inserted into the inside of the card reader.

13. The card reader according to claim 12, wherein
the tip end detection mechanism comprises:
an abutting member comprising an abutting part which is moved to an inserting direction side when the tip end face of the card in the inserting direction is abutted;
a sensor configured to detect movement of the abutting member; and
an urging member structured to urge the abutting member so that the abutting part pushes the card in the ejecting direction,
at least a part of the pushing-out mechanism is structured of the abutting member and the urging member, and
in a case that one of the two tip end detection mechanisms detects that the tip end face of the card has been inserted to the predetermined position but that the other of the two tip end detection mechanisms does not detect that the tip end face of the card has been inserted to the predetermined position, the drive source for moving the pulling-out prevention member is not driven, and the card is pushed in the ejecting direction by the abutting member and the urging member.

14. The card reader according to claim 13, wherein
the insertion posture detection mechanism comprises:
a width detection mechanism structured to detect whether the card is inserted into the insertion port in its short-side direction; or not; and
a front/rear face detection mechanism structured to detect whether a front face of the card inserted into the insertion port faces upward or its rear face faces upward.

15. The card reader according to claim 13, wherein
the card comprises a magnetic stripe, and
the front/rear face detection mechanism comprises at least one of a magnetic head or a magnetic sensor configured to detect the magnetic stripe and a metal detection mechanism structured to detect the external connection terminal.

16. The card reader according to claim 13, wherein the card insertion part comprises a recessed part which is recessed from an end face on an ejecting direction side of the card insertion part toward an inserting direction side.

* * * * *